United States Patent Office 2,927,882
Patented Mar. 8, 1960

2,927,882
INSECTICIDE FORMULATIONS AND METHOD OF MAKING SAME

Leo Trademan, Chicago, Marshall A. Malina, Wilmette, and Louis P. Wilks, Chicago, Ill., assignors to Velsicol Chemical Corporation, Chicago, Ill., a corporation of Illinois No Drawing. Application November 18, 1957
Serial No. 696,918

6 Claims. (Cl. 167—22)

This invention relates to insecticide compositions and to methods of stabilizing them. More particularly, the present invention relates to dry formulations of phosphate insecticides stabilized with polyhydric alcohols.

Dry formulations of phosphate insecticides fall into three main classifications, namely, dusts, wettable powders, and granular formulations. Dusts and granular formulations differ primarily in particle size of the carrier or diluent used. For example, a typical dust formulation may comprise an insecticide dispersed in a solid carrier having a particle size smaller than about 325 mesh. A typical granular formulation would comprise an insecticide dispersed in a solid carrier having a particle size of about 20–80 mesh. A typical wettable powder comprises an insecticide and a solid carrier having a particle size of the order of that used for dust formulations, in conjunction with wetting and dispersing agents.

Typically, a granular formulation may contain from about 2% to about 35% insecticide by weight. This type of formulation is generally used as such without further dilution with an insecticidally inert carrier in such fields as agriculture.

Typically, a dust formulation can contain about 0.25% insecticide up to about 50% insecticide by weight. Frequently, the dust formulations are first prepared as so-called "concentrates" which contain typically from about 10% to about 50% insecticide dispersed in the dust, and such "concentrate" is further diluted to a so-called "field strength" dust typically having an insecticide concentration of about 0.25% to about 5%, varying with the use desired and the potency of the toxicant.

The wettable powders typically contain a concentration of toxicant on the order of that contained in dust concentrates as above described. However, they are diluted to "field strength" by dispersing in water rather than by dispersing in dust.

The toxicant ingredient of the dry insecticide formulations which is stabilized by the present invention is selected from the class of insect toxicants containing a minimum of one phosphate radical, specifically typified by malathion, parathion and methyl parathion, either in their pure or technical form.

The carriers or diluents generally used with these insect toxicants, and which in their normal state are active in deteriorating the aforesaid class of toxicants when mixed therewith without treatment as specified in the present invention, are solids of the class consisting of kaolin clays, attapulgite clays, diatomaceous earths, vermiculites and synthetic calcium silicates.

Kaolins such as kaolinite, dickite, nacrite, anauxite, halloysite are useful as carrier materials. Attapulgites such as fuller's earth, attapulgite and sepiolite are useful as carrier materials. Diatomaceous earths such as diatomite and kieselguhr are useful as carrier materials. Vermiculites such as biotite are useful as carrier materials. Synthetic calcium silicates such as Micro-Cel and Silene EF are useful as carrier materials.

The novel stabilizers of the present invention are highly effective regardless of the particle size thereof or formulation type, such as whether they be in a dust form, wettable powder or granular form. Further, specified glycols will function in accordance with the present invention in insecticide formulations containing other additives such as stickers, dispersing agents, and the like.

Having now described the types of formulations herein concerned, the insect toxicants employed, and the carriers and diluents used, a brief discussion of the problem encountered in such formulations will be helpful in understanding the present invention.

While the solid carriers above discussed are very useful in formulating the herein defined toxicants for reasons of their inexpensiveness, availability, ease of handling, absorbency characteristics, durability and other desirable physical properties, they have the disadvantageous property, to varying degrees, of degrading or decomposing the insect toxicant when intimately mixed therewith. While this degrading action is a slow process, it is significant and troublesome since dry formulations are often prepared as concentrates or even field strength materials and then stored for periods which may be as long as a year or more. During this storage period the effect of the carrier or diluent on the insect toxicant ingredient may reduce its effectiveness to the point where satisfactory insect control under field conditions is no longer obtainable.

The nature of the reaction or effect of the carriers on the phosphate insecticide has not been fully elucidated. The rate of toxicant deterioration may vary by the action of different carriers or diluents.

To solve the present problem it has been found necessary to neutralize the activity of the solid carriers and diluents so that they are inert to the insect toxicant and will allow protracted storage of dry insecticide formulations without deterioration of insecticidal activity of such formulation.

Since the formulations herein concerned are used preponderantly in agriculture, any treatment of the carriers and diluents used must necessarily not render the formulation unfit for agricultural use on food and forage crops at time of harvest. Thus the treatment must not render the formulation phytotoxic. The treatment must likewise not be hazardous from a warm-blooded animal toxicity standpoint, or otherwise increase the hazard in the utilization of insecticide formulations. Also, of primary importance, and considering the economics involved, the treatment must not involve expensive materials, nor can the process of treatment be complex. Another consideration in the present problem is that the treatment must not affect the insecticidal activity of the toxicant employed.

It is therefore an object of the present invention to provide an additive to dry insecticide formulations which will prevent deterioration of the insect toxicant ingredient during storage.

It is another object of the present invention to provide an additive to dry insecticide formulations for the purpose of stabilizing them, which is neither acidic nor basic, and which is relatively nontoxic.

It is another object of the present invention to provide an additive to dry insecticide formulations, for the purpose of stabilizing them, which is not deleterious to plant life.

Further, it is an object of the present invention to stabilize dry insecticide formulations by inexpensive means and by use of readily available ingredients.

It has now been discovered that the solid carriers and diluents which were previously described and which are active in deteriorating the class of insecticides herein concerned can be rendered substantially inert by the addition thereto of a small quantity of glycol material selected from the class ethylene glycol, diethylene glycol, propylene glycol, and triethylene glycol.

It is surprising and unexpected that these materials should be as effective as they are, since they are neutral insofar as pH is concerned and their stabilizing effect in the present instance could not be predicted from the prior art.

In addition to being so effective as stabilizers, the present compounds have the further advantage of being liquids of relatively low volatility and therefore lend themselves to ready incorporation into the formulations herein concerned without evaporation during mixing or storage.

The glycol additives of the present invention have the beneficial effect of alleviating or eliminating degradation or deterioration of the insect toxicant ingredient in dry insecticide formulations when contained in such formulation in amounts varying between about ½% to about 12% by weight based on the weight of carrier or diluent contained in the formulation. A preferred concentration of glycol additive to dry insecticide formulations is about 2% to about 8% by weight based on the weight of carrier or diluent.

The art of blending materials with solid carriers and diluents of the class herein described is well known, and the liquid additives of the present invention can be blended with these solid materials by any known means. For example, the use of commercial type mixers or blenders is adequate. The present glycols can be added to and blended with the solid carriers either alone or in combination with an inert, relatively volatile solvent which can be removed after blending.

The glycol additives can be added to the solid carriers prior to blending the insect toxicant therewith. In the alternative, the glycol additives can be added to the solid carriers during the same blending operation wherein mixing of the insect toxicant and carrier is achieved. It is preferred to preblend the glycol additive to the carrier before blending the insect toxicant.

The following table exemplifies the beneficial effect of the present glycol additives using diethylene glycol as representative of the glycols herein disclosed and methyl parathion of 80% purity as representative of the insect toxicant.

In all of the formulations containing the novel glycol stabilizer of the present invention, the stabilizer was blended with the carrier material by mixing and blending for ten minutes in a standard dry blender. This combination was then used to prepare the desired strength methyl parathion concentrate by standard blending technique. The nonstabilized formulations were prepared by blending the carrier material and phosphate insect toxicant in a standard dry blender for approximately ten minutes.

Table

| Carrier | Diethylene Glycol Concentration (Percent of Carrier Weight) | Percent Methyl Parathion | | |
| --- | --- | --- | --- | --- |
| | | 0 days | 30 days | 60 days |
| Attaclay | 0 | 15.0 | 12.8 | 12.5 |
| Do | 8 | 15.0 | 15.0 | 15.0 |
| Barden Clay | 0 | 15.0 | 12.0 | 11.1 |
| Do | 3 | 14.9 | 14.9 | 14.9 |
| Micro-Cel | 3 | 15.0 | 14.4 | 15.1 |
| Do | 0 | 15.0 | 12.0 | 10.5 |

It is evident from a review of the above table that a small quantity of the present glycol stabilizers unexpectedly provides superior protection against deterioration of the insect toxicant when in contact with the indicated carrier materials. While diethylene glycol was used in the experiments summarized in this table, ethylene glycol, triethylene glycol and propylene glycol can be utilized in place thereof with equal efficiency. Likewise, while methyl parathion was used in said determinations, parathion and malathion when used as the insect toxicant produce like results. So, too, when others of the previously described carriers are used in the insecticide formulations comparable results are obtained.

It should be further pointed out that the experiments summarized by this table were performed at room temperature and for relatively short periods of time, conditions quite mild in comparison to the severe accelerated tests using high temperatures normally employed and which result in severe deterioration of the insect toxicant.

Since insecticide formulations are often stored for long periods of time and under pressure caused by stacking of the containers, and since these formulations are used throughout the world under a wide variety of temperatures, the herein described tests are quite conservative. Under high temperatures and pressure the rate and degree of deterioration of the insect toxicant will be vastly increased, enhancing the necessity for its prevention by inexpensive, easily handled methods. Consequently the present invention has solved a universal problem of utmost importance in the agricultural field, thus permitting widespread use of the specified insect toxicant without the problem of deterioration or impairment of its insect toxicity.

We claim:

1. A stabilized insecticidal composition comprising in combination: an insect toxicant selected from the group consisting of parathion, methyl parathion and malathion; a finely divided solid carrier selected from the group consisting of kaolin clay, attapulgite clay, diatomaceous earth, vermiculite and synthetic calcium silicate; and from about 0.5% to about 12% by weight of the carrier of a glycol selected from the group consisting of ethylene glycol, propylene glycol, diethylene glycol and triethylene glycol.

2. A stabilized insecticidal composition comprising in combination: parathion; a finely divided solid carrier selected from the group consisting of kaolin clay, attapulgite clay, diatomaceous earth, vermiculite and synthetic calcium silicate; and from about 0.5% to about 12% by weight of the carrier of a glycol selected from the group consisting of ethylene glycol, propylene glycol, diethylene glycol and triethylene glycol.

3. A stabilized insecticidal composition comprising in combination: methyl parathion; a finely divided solid carrier selected from the group consisting of kaolin clay, attapulgite clay, diatomaceous earth, vermiculite and synthetic calcium silicate; and from about 0.5% to about 12% by weight of the carrier of a glycol selected from the group consisting of ethylene glycol, propylene glycol, diethylene glycol and triethylene glycol.

4. A stabilized insecticidal composition comprising in combination: malathion; a finely divided solid carrier selected from the group consisting of kaolin clay, attapulgite clay, diatomaceous earth, vermiculite and synthetic calcium silicate; and from about 0.5% to about 12% by weight of the carrier of a glycol selected from the group consisting of ethylene glycol, propylene glycol, diethylene glycol and triethylene glycol.

5. The method of preparing a stable, dry insecticide formulation which comprises blending from about 0.5% to about 12% by weight based on the weight of solid carrier of a glycol selected from the group consisting of ethylene glycol, diethylene glycol, triethylene glycol and propylene glycol and from about 0.25% to about 50% by weight of insect toxicant selected from the group consisting of parathion, methyl parathion and malathion with a finely divided solid carrier selected from the group consisting of kaolin clay, attapulgite clay, diatomaceous earth, vermiculite and synthetic calcium silicate.

6. The method in accordance with that of claim 5 wherein the glycol is preblended with the carrier and the resulting blend is blended with the insect toxicant.

References Cited in the file of this patent

UNITED STATES PATENTS

| | | |
| --- | --- | --- |
| 2,639,259 | Wellman | May 19, 1953 |
| 2,641,563 | Moore | June 9, 1953 |
| 2,832,716 | Cassil | Apr. 29, 1958 |